US011320554B2

(12) United States Patent
Xia

(10) Patent No.: US 11,320,554 B2
(45) Date of Patent: May 3, 2022

(54) METHOD AND SYSTEM THAT USES AN ANISOTROPY PARAMETER TO GENERATE HIGH-RESOLUTION TIME-MIGRATED IMAGE GATHERS FOR RESERVOIR CHARACTERIZATION, AND INTERPRETATION

(71) Applicants: China Petroleum & Chemical Corporation, Beijing (CN); Sinopec Tech Houston, Houston, TX (US)

(72) Inventor: Fan Xia, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 17/008,002

(22) Filed: Aug. 31, 2020

(65) Prior Publication Data
US 2022/0066059 A1    Mar. 3, 2022

(51) Int. Cl.
*G01V 1/30* (2006.01)
(52) U.S. Cl.
CPC .............. *G01V 1/303* (2013.01); *G01V 1/306* (2013.01); *G01V 2210/52* (2013.01); *G01V 2210/626* (2013.01); *G01V 2210/6222* (2013.01)
(58) Field of Classification Search
CPC .... G01V 1/303; G01V 1/306; G01V 2210/52; G01V 2210/6222; G01V 2210/626
USPC ..................................................... 702/17, 18
See application file for complete search history.

(56) References Cited

U.S. PATENT DOCUMENTS

| | | | |
|---|---|---|---|
| 6,864,890 | B2 | 3/2005 | Meek |
| 6,904,368 | B2 * | 6/2005 | Reshef ................... G01V 1/362 |
| | | | 702/17 |
| 7,355,923 | B2 | 4/2008 | Reshef |
| 7,663,972 | B2 * | 2/2010 | Martinez .................. G01V 1/28 |
| | | | 367/52 |
| 8,750,074 | B2 | 6/2014 | Blias |
| 2018/0335533 | A1 | 11/2018 | Xia |

OTHER PUBLICATIONS

"Seismic Depth Imaging in Anisotropic Media", Li Lu, Mar. 2014 (Year: 2014).*

* cited by examiner

*Primary Examiner* — John H Le
(74) *Attorney, Agent, or Firm* — Novick, Kim & Lee, PLLC; Allen Xue

(57) ABSTRACT

A method and a system for implementing the method are disclosed wherein the pre-stack seismic input data, an initial anellipticity anisotropy parameter, and a baseline normal moveout velocity from a non-flat surface, are sometimes mild or foothill topography as well as the shot and receiver lines might not necessarily be straight, and often curve to avoid obstacles on the land surface. In particular, the method and system disclosed, allows for updating the anisotropy parameters iteratively and when the stopping criteria is satisfied, the final estimated parameter can be directly used for time migration. This method and system are mainly used for time migration with the purpose of obtaining the high fidelity (accurate amplitude, i.e. not only travel-time correct but also amplitude correct) image gathers which are used for reservoir characterization and interpretation.

6 Claims, 8 Drawing Sheets

METHOD AND SYSTEM THAT USES AN ANISOTROPY PARAMETER TO GENERATE HIGH-RESOLUTION TIME-MIGRATED IMAGE GATHERS FOR RESERVOIR CHARACTERIZATION, AND INTERPRETATION

TECHNICAL FIELD

The present disclosure generally relates to seismic anisotropy used for seismic data processing in order to obtain a more accurate subsurface image. migrating seismic data using cross-spread land acquisition geometry.

BACKGROUND OF INVENTION

1. Introduction to Seismic Exploration

Exploration seismology aims at revealing the accurate location and amplitude of a target hydro-carbonate within a subsurface, from seismic data acquired at the earth surface. It uses artificially generated elastic waves to locate mineral deposits (including hydrocarbons, ores, water, geothermal reservoirs, etc.), archaeological sites, and to obtain geological information for post-processing applying physics and geology concepts, to obtain information about the structure and distribution of rock types. Usually, seismic exploration projects are done with a business goal in mind and, hence, cost-benefit is an ever-present concern. Nevertheless, seismic methods used during exploration alone cannot be used to determine many of the features that make a project profitable and, even when supplemented by other data, a unique method for processing the information is evident. Seismic exploration usually stops long before unambiguous answers are obtained and before all has been learned that might possibly be learned, because in the judgment of a person's having ordinary skills in the art, further information is better obtained in some other way, such as by drilling a well. As such, seismic methods are in continual economic competition with other methods. Nevertheless, almost all oil companies rely on seismic interpretation for selecting the sites for exploratory oil wells. Despite the indirectness of any the exploration methods used, the likelihood of a successful exploration project is significantly improved if certain known techniques are used in combination with project specific techniques, especially given the enormous amount information produced by 3-D techniques and computing processing power. This is due to the fact, that most receiving systems like geophones or hydrophones display two-dimensional or three-dimensional seismic "time sections", each consisting of large numbers of seismic traces. Although visual inspection of these seismic time sections can intuitively suggest shapes and locations of subsurface reflecting formations, the land acquisition input data may be inaccurate or misleading even to a person having ordinary skills in the art therefore leading to erroneous conclusions as to the actual shapes and locations of subsurface matters. Accordingly, recorded seismic data is usually manipulated for the purposes of producing migrated sections that depict the proper spatial locations of subsurface matter.

2. Recording Seismic and Land Acquisition Input Data

Geophysicists and exploration teams use controlled charges of dynamite or vibrioses trucks for onshore exploration, while airguns are used offshore explorations in order to release waves of sound into the earth. The waves of sound generated by either of these methods, vibrate underground and bounce back to the surface which instead are received on a receiving device placed in a specific pattern across the terrain. Their number and placement patterns are dependent upon the design, cost, and size of the survey.

As waves of sound vibrate into the receiving system, they are recorded or saved to a memory resource, which are then displayed as sound patterns or "traces" of subsurface formations. The patterns of these wave generators and their recording devices create many complexities of scientific data which tend to be displayed as:

Two-dimensional data using a single shot-line of data and representing the intersection of two axes, one horizontal and one vertical;

Three-dimensional surveys which add a horizontal axis, creating the perception of depth and providing additional data points for a potentially more accurate geophysical survey.

Four-dimensional technology, which is made out of 3D readings of the same location over time but showing movements of subsurface hydrocarbons over time.

Four-component technology which measures sound waves both horizontally and vertically.

Regardless of how the acquired data is displayed, it will still be considered "raw" or "unprocessed" and, before it can be used it must go through a series of computerized processes. These processes—filtering, stacking, migrating and other computer analysis, make the data useable but require powerful computers to process complex algorithms through sophisticated computer programs. As computers have become more powerful and processing techniques more sophisticated, it has become common to re-process seismic data acquired in earlier years, creating new opportunities for exploration that could not originally be derived from it.

In most situations, the cross-spread land acquisition geometry has dense shots in the shot line direction and dense receiver in the receiver line direction, especially when the source ones and receiver lines are orthogonal. As such, common shot or common offset processing (including migration) are not optimal for these survey data points and ends up requiring several more shots or offsets than the number of common spreads (also known in the art as super shots or super offsets). For fixed migration parameters, the efficiency of a beam migration for a fixed survey is inversely proportional to the number of beam centers or is proportional to the number of traces inside each beam centers.

3. Data Processing

Processing the acquired seismic input and land acquisition data over a survey region, is typically done by geophysicists using special purpose computers typically comprising hybrid GPU/GPU processors. As such, the processing of these techniques is expensive, but they tend to be technically robust as they provide excellent results. However, a close association of the geophysicist, the data, and the processor is absolutely essential for the results to be useful. It is just that well logs, known depths, results from ancillary methods, custom formulas, algorithms, as well as the expected results all should be furnished to the computer system to process the data through a computer-implemented software program. This reduces the originally recorded data from the acquisition step (pre-stack data) into the data volumes (post-stack data) that are used for interpretation to locate hydrocarbon reservoirs in the subsurface of the earth. There are many steps involved with the processing of data, that can be categorized into different classes:

1) Categorizing acquired data. This step assigns each trace to its common surface and subsurface location as well as shot to receiver distance and azimuth for example;

2) Time adjustments. This step compensates for travel time differences due to variations in surface topography and near surface geologic variations and source to receiver distance variations. These processes are commonly referred to as "statics" and "nmo" or normal moveout".

3) Wavelet compression. This step collapses reflection events into a very short duration event instead of the original recorded signature. This is typically referred to as "Deconvolution" which has a variety of different technical implementations, 4) Noise Attenuation and signal to noise ratio improvements. This step removes as much noise as possible while retaining and enhancing as much of the primary signal as possible.

5) Adding (or stacking) traces that have a common subsurface reflection point.

6) Pre and/or post stack imaging. This step relocates all of the recorded samples and builds an image with the events of the image displayed at their proper positions in time (or depth) and space. Imaging, or migration, is one of the most complex and compute intensive steps in the processing sequence.

7) Other steps that can be used to extract more geologic information from the recorded seismic data to add more information to the interpretation step.

a. Seismic Anisotropy

Over the past several decades, persons of ordinary skill in the art have taken particular consideration in seismic anisotropy for seismic data processing in order to obtain a more accurate subsurface image. In the presence of anisotropy over a survey region, nonhyperbolic moveout of P-wave for layered transverse isotropy with a vertical symmetry axis (VTI) media, as observed in common-midpoint (CMP) gathers, is controlled by the anellipticity parameter $\eta$, which is responsible for the influence of anisotropy on all time-processing steps, including dip-moveout (DMO) correction and time migration (See Grechka, V., and I. Tsvankin, 1998, *Feasibility of nonhyperbolic moveout inversion in transversely isotropic media: Geophysics*, vol. 63, pp. 957-969). It is common practice for a person of ordinary skills in the art, to obtain initial estimates of the key time-processing parameter $\eta$ by ascribing the nonhyperbolic character of the moveout to the presence of anisotropy (See Douma, H., and M. van der Baan, 2008, *Rational interpolation of qP-traveltimes for semblance-based anisotropy estimation in layered VTI media: Geophysics*, vol. 73, no. 4, pp. D53-D62), and there has been considerable published work in terms of estimating effective parameter of anisotropy from P-wave data, focusing primarily on the application of non-hyperbolic moveout analysis in the pre-migrated domain with varying levels of diffractions.

In particular, examples of the nonhyperbolic moveout equation were developed by Tsvankin and Thomsen (See Tsvankin, I., and L. Thomsen, 1994, *Nonhyperbolic reflection moveout in anisotropic media: Geophysics*, vol. 59, pp.1290-1304) and used to enable anisotropy parameters to be estimated from P-wave data in VTI media. Said equation was later rewritten by Alkhalifah and Tsvankin (See Alkhalifah, T., and I. Tsvankin, 1995, *Velocity analysis in transversely isotropic media: Geophysics*, vol. 60, pp. 1550-1566) with notably discovery of P-wave time-processing parameter $\eta$. To reduce the bias in estimated values of $\eta$ when using the nonhyperbolic moveout equation from Alkhalifah and Tsvankin, Id.; Douma and Calvert (See Douma, H., and A. Calvert, 2006, *Nonhyperbolic moveout analysis in VTI media using rational interpolation: Geophysics*, vol. 71, no. 3, pp. D59-D71), proposed a rational-interpolation method for traveltimes of P-wave in VTI media with improved accuracy for large offset-to-depth ratios. Even though this equation removed the systematic errors as noted by Grechka and Tsvankin, supra, Douma and van der Baan, supra, demonstrated that the inversion for $\eta$ is inherently uncertain and more sensitive to the presence of noise, and hence the error in the estimated values of $\eta$ shall have implications for the subsequent prestack time migration (PSTM).

b. Fundamental Basis of Prestack Seismic Inversion

The Zoeppritz equations (Zoeppritz, K., 1919, Erdbebenwellen VII, VII B, Über Reflexion and Durchgang seismischer Wellen durch Unstetigkeitsflächen: Nachrichten von der Königlichen Gesellschaft der Wissenschaften zu Göttingen: Mathematisch-physikalische Klasse, pp. 66-84.) are the fundamental basis of prestack seismic inversion, which describes a nonlinear relationship between the reflectivity of an interface at a given angle of incidence and the elastic properties of the medium on both sides of the interface. However, the inherent complexity and high non-linearity of the Zoeppritz equations prevents them from solving large-scale multilayered and multidimensional geological models. In practice, prestack seismic inversion methods are based on the first-order linear approximation to the Zoeppritz equations under the assumption that two homogeneous half-spaces are welded at an elastic interface, and that only small relative changes in elastic parameters occur across the boundary. Due to their simplicity in mathematical form and computational efficiency, a series of linearized approximations of the Zoeppritz equation have been derived over the past decades, and used on various computer-implemented methods and systems (See Bortfeld, R., 1961, *Approximations to the reflection and transmission coefficients of plane longitudinal and transverse waves: Geophysical Prospecting*, v. 9, no. 4, pp. 485-502.; the Aki Richards equation: Aki, K., and P. Richards, 1980, *Quantitative seismology: Theory and methods: W. H. Freeman and Co.*; Shuey, R., 1985, *A simplification of the Zoeppritz equations: Geophysics*, v. 50, no. 4, pp. 609-614; and Fatti, J., G. Smith, P. Vail, P. Strauss, and P. Levitt, 1994, *Detection of gas in sandstone reservoirs using AVO analysis: A 3-D seismic case history using the geostack technique, Geophysics*, v. 59, no. 9, pp. 1362-1376).

The most well-known industry standard approximations to the Zoeppritz equations were proposed by Aki and Richards, which expressed the P-wave reflectivities as a series of velocities and density contrasts with angles of incidence that were valid up to 40 degrees and small changes of elastic properties across a boundary. The Aki and Richards equation is an important linear approximation to the Zoeppritz equations, which led to the development of other approximate equations that are also widely applied in the industry, namely, those proposed by Shuey and Fatti, supra. However, these equations are derived based on first-order approximation to the Zoeppritz equations and only hold effective for relatively small elastic-property contrasts, across an interface, and for relatively small angles of incidence at the interface. In presence of large relative changes of elastic and anelastic parameters across the reflecting boundary of the survey region, nonlinear approximations to the Zoeppritz equations would be appropriate for accurate determination of elastic parameters. By deriving high order approximations or adding correction terms to a linear approximation, many researchers improved the accuracy of nonlinear approximations to large angles (See Wang, Y., 1999, *Approximations to the Zoeppritz equations and their use in AVO analysis, Geophysics*, v. 64, no. 6, pp. 1920-1927; Stoves, A., and B. Ursin, 2001, *Second order approxi-* mations of the reflection and transmission coefficients between two viscoelastic isotropic media, *Journal of Seismic Exploration*, v. 9, pp. 223-233; Zhi, L., S. Chen, and X. Li, 2016, *Amplitude variation with angle inversion using the exact Zoeppritz equations—Theory and methodology, Geophysics*, v. 81, no. 2, N1-N15). In contrast, others have concluded that the nonlinearity of the seismic reflection AVO response is important, even at low-angle range, mostly when the elastic properties that cause the reflection involve sufficiently large contrasts.

c. Time-Migrated Images

Time-migrated subsurface images preserve relative amplitude information and are free from the effects of illumination, which have been widely used to conventional amplitude inversion for extracting further information on lithology, reservoir quality and fluids. Meanwhile, a PSTM provides an effective tool for updating anisotropy parameters because of its sensitivity to the anisotropy parameter and its capacity to generate the residual errors in the post-migrated domain. In VTI media, the use of accurate estimates of anellipticity parameter η, flattens far offsets in the post-migrated common image gathers (CIG) and also improves the focusing of diffractions, sharps discontinuous faults, and correctly positions fault plane reflections. Otherwise, the nonhyperbolic residual moveout (RMO) or the well-known hockey stick effects are present on the CIG at far offsets. Therefore, it is an object of the present invention that incoherent time-migrated images carry important information that can be used to update the initial anellipticity parameter η from P-wave data.

d. Non-Hyperbolic Residual Moveout Analysis

The standard hyperbolic approximation for reflection moveouts in layered media is accurate only for relatively short spreads, even if the layers are isotropic. Velocity anisotropy may significantly enhance deviations from hyperbolic moveout. If the medium is anisotropic or heterogeneous, hyperbolic moveout equation parameterized by NMO velocity loses accuracy with increasing offset. Angle-dependent velocity makes reflection moveout nonhyperbolic even in a single homogeneous layer, unless the anisotropy is elliptical. Therefore, nonhyperbolic analysis in anisotropic media becomes important because conventional hyperbolic moveout processing on short spreads is insufficient to recover the true vertical velocity (hence the depth).

Nevertheless, as conventional processing of reflection P-wave data is still based on the assumption of isotropy, there still is a growing understanding that anisotropy may seriously affect the results of most basic processing and interpretation steps, such as normal moveout (NMO) correction, velocity analysis, migration, dip moveout (DMO) removal, and amplitude-variation with-offset (AVO) analysis. Yet, because the shape of the moveout curves for reflected waves is of primary importance to most processing and interpretation algorithms, they are conventionally approximated by the hyperbolic equation of:

$$t^2 \approx t_H^2 \equiv t_v^2 + \frac{x^2}{V_{rmo}^2}; \quad (1)$$

where t; is the approximate vertical (zero-offset) arrival time, x is the source-receiver offset, and $V_{rmo}$ is called the "moveout velocity." To invert reflection data for vertical velocities, $V_{rmo}$ is often identified with the root-mean-square (rms) velocity $V_{rms}$ (See Taner, M. T., and Koehler, F., 1969, *Velocity spectra-digital computer derivation and applications of velocity functions: Geophysics*, vol. 34, pp. 859-881). The concept of hyperbolic moveout (and departures from it) becomes unnecessary if prestack depth migration is used. However, the results form a useful guide for understanding results of anisotropic prestack migration (See Gonzalez, A., and Lynn, W., 1991, *Prestack frequency-wavenumber (f-k) migration in a transversely isotropic medium, EAEG Ann. Mtg., Extended Abstracts*, pp. 132-133). The hyperbolic moveout equation (1) is strictly valid only for a homogeneous isotropic (or elliptically anisotropic) plane layer which, in the presence of anisotropy, it causes two principal distortions of reflection moveouts.

First, it causes the short-spread moveout velocity in the presence of anisotropy to not be equal to the rms vertical velocity, even for horizontal layers (See Thomsen, L. A., 1986, *Weak elastic anisotropy: Geophysics*, vol. 51, pp. 1954-1966). The difference between vertical rms and moveout velocities, ignored by conventional techniques, may lead to unacceptable errors in interval velocities and in time-to-depth conversion, even for weak anisotropy (See Winterstein, D. F., 1986, *Anisotropy effects in P-wave and S-wave stacking velocity contain information on lithology: Geophysics*, vol. 51, pp. 661-672). In anisotropic media, it is impossible to obtain the true vertical velocity from the short-spread moveout velocity alone. Recovery of the true vertical velocity from surface data requires, at a minimum, analysis of long-spread (nonhyperbolic) moveouts.

The second causes, leads anisotropy to a nonhyperbolic moveout, even in a homogeneous layer. If not properly corrected, nonhyperbolic moveout causes distortions in velocity estimation and deteriorates the quality of stacked sections. To determine whether stacking velocities really represent short-spread moveout velocities (which are useful in analysis), it is necessary to understand the character of deviations from hyperbolic moveout in layered anisotropic media. Most existing work on P-wave reflection moveout in anisotropic media has been done for transversely isotropic media, usually with a vertical symmetry axis. This is the simplest common type of anisotropy, and has been frequently observed in both land and marine environments (See Berge, P. A., Mallick, S., Fryer, G. J., Barstow, N., Carter, J. A., Sutton, G. H., and Ewing, J. 1., 1991, *In-situ measurement of transverse isotropy in shallow-water marine sediments: Geophysics J. Int.*, vol. 104, pp. 241-254). Among the causes of vertical transverse isotropy are the interleaving of thin horizontal layers, intrinsic anisotropy of preferentially aligned rock-forming minerals, and certain populations of cracks. All formulations in this paper assume transverse anisotropy with a vertical symmetry axis, but are independent of the physical reasons for the anisotropy.

4. Residual Moveout in an Anisotropic Time-Migrated Common Image Gather

Errors in estimates of anellipticity parameter η produce the nonhyperbolic RMO or as commonly known in the art "the hockey stick effect" on the time-migrated CIG at far offsets. Typically, RMO is analyzed on the offset image gathers, one of the time-migrated CIG that can be generated by, for example, Kirchhoff PSTM. The description of P-wave analytical RMO function on a long-spread offset image gather is based on the established nonhyperbolic moveout equation developed by Alkhalifah and Tsvankin, supra, in terms of the anellipticity parameter η. For horizontally layered VTI media, this moveout equation has the form:

$$T^2(x) = t_0^2 + \frac{x^2}{V_{nmo}} - \frac{2\eta_0 x^4}{V_{nmo}^2[t_0^2 v_{nmo}^2 + (1+2\eta)x^2]}; \quad (2)$$

where T is the two-way reflection travel-time, $t_0$ is the two-way zero-offset reflection traveltime, and x is the offset between a source and a receiver; $V_{nmo}$ and $\eta$ are the effective NMO velocity and the effective anellipticity parameter, respectively.

In a post-migrated domain, the P-wave data represents the time positions of multiple images of a reflector. Given an initial effective anellipticity parameter $n_o$ and a reference effective NMO velocity $V_{nmo}$, an analytical RMO function was defined to measure time residuals of the long-spread offset image gather generated by anisotropic Kirchhoff PSTM according to the following expression:

$$t^2(x) = T^2(x) - \frac{x^2}{V_{nmo}} + \frac{2\eta x^4}{V_{nmo}^2[t_0^2 V_{nmo}^2 + (1+2\eta)x^2]}; \quad (3)$$

where t is the migrated time of an image point as a function of offset in an offset image gather, T is the two-way reflection travel-time from P-wave data. Thus, substituting equation (2) into equation (3) yields the following expression:

$$t^2(x) = t_0^2 + \frac{2\eta_0 x^4}{V_{nmo}^2[t_0^2 V_{nmo}^2 + (1+2\eta)x^2]} - \frac{2\eta x^4}{V_{nmo}^2[t_0^2 V_{nmo}^2 + (1+2\eta)x^2]}; \quad (4)$$

Specifically, an analytical RMO function can be derived for measuring time residuals of the long-spread offset image gather generated by the isotropic Kirchhoff PSTM when only NMO velocity is available from the anisotropic P-wave data, i.e., $\eta_0=0$. Equation 4 is then simplified to:

$$t^2(x) = t_0^2 - \frac{2\eta x^4}{V_{nmo}^2[t_0^2 V_{nmo}^2 + (1+2\eta)x^2]}; \quad (5)$$

Later on, Grechka and Tsvankin, supra, introduced a correction into the nonhyperbolic moveout equation of Alkhalifah and Tsvankin, supra, that makes it even more accurate at intermediate offsets most important for nonhyperbolic moveout analysis. This modification changes the moveout at large offsets yet keeps the correct values of the quadratic and quartic moveout coefficients, which can be used to compute the semblance S of an offset image gather, as defined by the following expression:

$$S(\eta, t_0) = \frac{\int_{-t_0-\frac{l}{2}}^{t_0+\frac{l}{2}} \left[\int q(t(\eta, x), x)dx\right]^2 dt}{\int_{-t_0-\frac{l}{2}}^{t_0+\frac{l}{2}} \int q^2(t(\eta, x), x)dxdt}; \quad (6)$$

where t is a proposed RMO function defined by equation 5, $t_0$ is a migrated-time of the image point at zero offset, x is the offset between a source and a receiver, q is a trace amplitude in an offset image gather, and l is a window length used to smooth the semblance spectrum estimates. Effective values of the anellipticity parameter $\eta$ for different time $t_o$ are then obtained from the picked maxima values of the semblance. The semblance S can be generated by scanning values of $\eta$ from −0.2 to 0.2.

5. Summary

In summary, existing technology in the art is solely used for specific purposes which typically correspond to estimating anisotropy parameters based on pre-migrated seismic data, thereby generating time-migrated images with preserved relative amplitude information, high signal to noise ratio, and free from the effects of illumination. Nevertheless, some persons skilled in the art have realized that existing technology in the art can also be used for updating the anisotropy parameter once, but only with eyes to serve as an initial value that should later on be further refined, before it can be used for migration. Therefore, aiming at some defects of the existing technology, the present embodiments of this invention introduce a new method and system that estimates anisotropy parameters iteratively (i.e. more than once) that can flatten far offsets in the time-migrated images while at the same time improving the focusing of diffractions, sharps discontinuous faults, and correctly positioning fault plane reflections, which provide high-resolution time-migrated image gathers for reservoir characterization and interpretation.

SUMMARY OF THE INVENTION

The present invention discloses a novel method and system based on semblance, for updating the effective anellipticity parameter n in time domain by analyzing the RMO on time-migrated CIG at far offsets in VTI media. Said method and system, discloses refining the initial anisotropy model for the anisotropic PSTM and anisotropic tomography. An approximate analytical RMO algorithm for measuring residual errors of the time-migrated CIG is used and an anisotropy parameter updated in the post-migrated domain. By using the nonzero RMO observed on a far-offset CIG for anisotropy parameter estimates, it reduces residual errors in the offset image gathers. The proposed invention can obtain the reference effective NMO velocity from a conventional hyperbolic moveout analysis using near-offset P-wave data; or a pre-migrated nonhyperbolic moveout analysis using long-spread P-wave data. Furthermore, the semblance analysis of the proposed method and system, can be used to automatically measure the coherence of residual errors in an offset image gather, thereby generating a semblance volume.

Additionally, the proposed method allows the conversion of interval values of the anellipticity parameter and zero-dip NMO velocity from the estimation of effective values of anisotropy parameter using a Dix-type layer-stripping procedure or more robust least-squares methods.

The technique of embodiments of the invention, present the novel geophysics concept of a semblance-based approach using an anisotropy parameter that gets updated, while generating high-resolution time-migrated image gathers for reservoir characterization, and interpretation. Said approach continuously updates the effective anellipticity parameter $\eta$ in the post-migrated domain using time-migrated CIG at far offsets in VTI media related to "downward continuations" as described in the art, but also referred to as an "extrapolation", which implies that there are not any directional constraints.

Therefore, its objective is to estimate anisotropy parameters iteratively (i.e. more than once) that can flatten far offsets in the time-migrated images while at the same time improving the focusing of diffractions, sharps discontinuous faults, and correctly positioning fault plane reflections, which provide high-resolution time-migrated image gathers for reservoir characterization and interpretation. In particular, the generated time-migrated images provide an effective tool for updating anisotropy parameters because of its sensitivity to the anisotropy parameter and its capacity to generate the residual errors in the post-migrated domain Furthermore, objects of embodiments of the present invention, involve determining an efficient, and accurate moveout curves from estimated anisotropy parameters, after performing semblance analysis. Objects of the present invention perform the proposed method and system, while storing the necessary information to a memory resource (e.g. disk), in order to reduce the computation time required for following seismic migration/stacking.

Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

The present disclosures are organized, in part, by: (i) first, utilizing a reference normal-moveout (NMO) velocity, an deriving an analytical RMO function to measure time residuals on time-migrated CIG as a function of effective values of $\eta$; (ii) secondly, the semblance analysis is applied to the RMO to directly search for effective values of an anellipticity parameter n; and (iii) third, an anisotropy model in time domain gets updated, while maintaining the simplicity, and low computation-costs of traditional residual migration-velocity analysis (See e.g. Al-Yahya, K., 1989, *Velocity analysis by iterative profile migration: Geophysics*, vol. 54, pp. 718-729.; and Xia, F., Y. Ren, and S. Jin, 2006, *Residual migration-velocity analysis using common angle image gathers: 76th Annual International Meeting*, SEG, Expanded Abstracts, pp. 2455-2459).

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
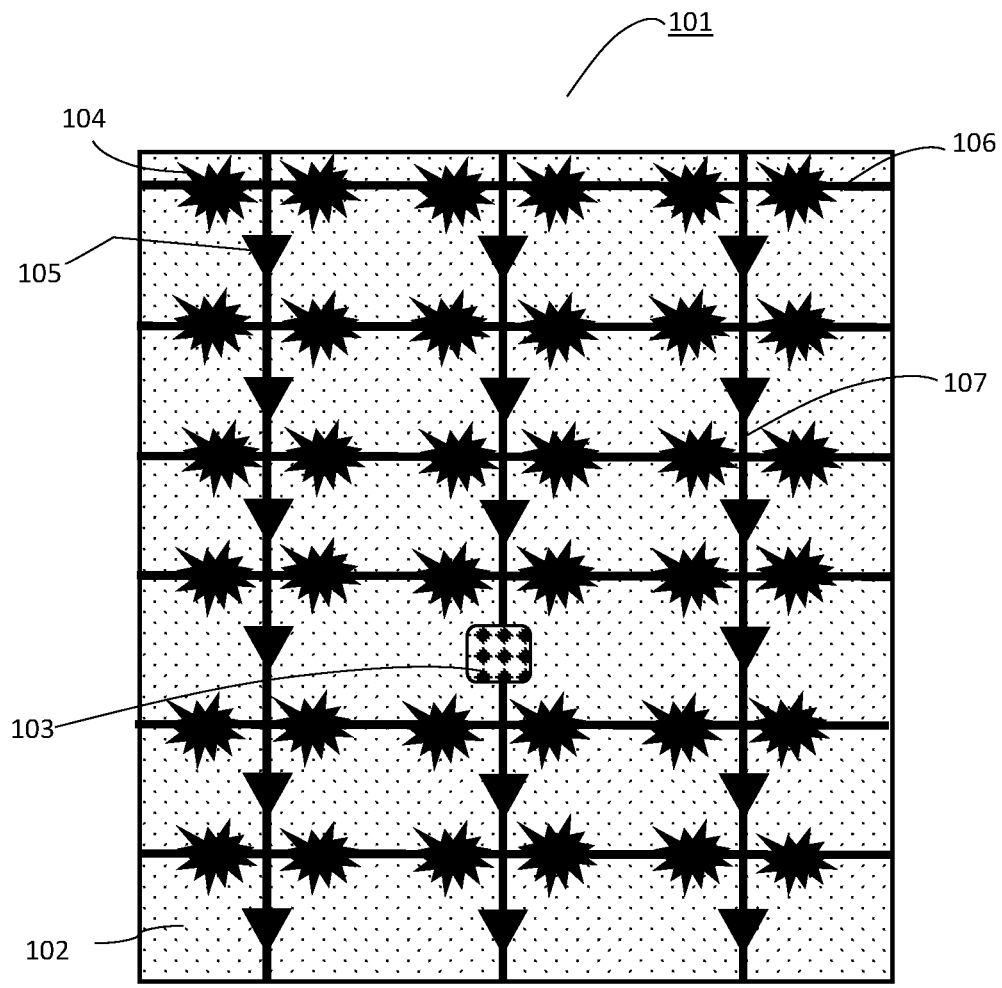
FIG. 1, is a schematic diagram showing top view of a survey region depicting a cross-spread acquisition geometry with receiver and shot lines, according to an embodiment of the present disclosure.

Referring to FIG. 1 an exemplary embodiment of a method for processing seismic data from a subsurface 100 is illustrated over a seismic survey region, 101, in which the preferred embodiment of the present invention is useful. It is important to note, that the survey region of FIG. 1 is a land-based region represented as 102 and that a complete survey plan, including swaths of shot (104) and receiver locations (105), as shown in FIG. 1 may vary depending upon survey characteristics like goals, budget, resource, and time.

Persons of ordinary skill in the art, will recognize that seismic survey regions like 101 produces detailed images of local geology in order to determine the location and size of possible hydrocarbon (oil and gas) reservoirs, and therefore a potential well location 103. Land acquisition geometry represented by FIG. 1 commonly is carried out by swath shooting in which receiver cables are laid out in parallel lines (inline direction) and shots are positioned in a perpendicular direction (crossline direction). In these survey regions, sound waves bounce off underground rock formations during blasts at various points of incidence or shots 104, and the waves that reflect back to the surface are captured by seismic data recording sensors, 105, transmitted by data transmission systems, from said sensors, 105, then stored for later processing, and analysis by the computing system of FIG. 4. Although shots 104, are represented in FIG. 1 as a cross-spread pattern geometry with shot lines, 106 mostly running horizontally, a person having ordinary skills in the art, would soon realize that said pattern could easily be represented in other ways, such as vertically, diagonally or a combination of the three. Similarly, the recording sensors 105, are placed on receiver lines, 107 shown running across the shot lines 106 but could've also been represented. The swath shooting method yields a wide range of source-receiver azimuths, which can be a concern during analysis by the computing system of FIG. 4. The source-receiver azimuth is the angle between a reference line, such as a receiver line or a dip line, and the line that passes through the source and receiver stations. Nevertheless, because of operating conditions, uniform coverage as shown in FIG. 1, usually is not achievable over the entire survey area. However, to perform residual anisotropy analysis it is often useful in the art, to exploit the redundancy of seismic data and produce images with more dimensions than the two coordinates of the physical space. In the present invention, the final model of elastic properties may result in a three-dimensional cube made by computing a wide array of data, mainly represented in time domain. When the final model of elastic properties is created, no additional dimensions get included which in other situations, could have either be the absolute offset and azimuth.

Errors in estimates of anellipticity parameter η produce the nonhyperbolic RMO or the well-known hockey stick effect on the time-migrated CIG at far offsets. Typically, RMO is analyzed on the offset image gathers, one of the time-migrated CIG that can be generated by, for example, Kirchhoff PSTM. The objective of this method is to use the nonzero RMO observed on far-offset of CIG for anisotropy parameter estimates to reduce residual errors in the offset image gathers.

The description of P-wave analytical RMO function on a long-spread offset image gather is based on the established nonhyperbolic moveout equation developed by Alkhalifah and Tsvankin, supra, in terms of the anellipticity parameter η. For horizontally layered VTI media, this moveout equation has the form observed in (3) where T is the two-way reflection traveltime, $t_0$ is the two-way zero-offset reflection traveltime, an x is the offset between a source and a receiver; $V_{nmo}$ and η are the effective NMO velocity and the effective anellipticity parameter, respectively.

In the post-migrated domain, the P-wave data represent the time positions of multiple images of a reflector. Given an initial effective anellipticity parameter $n_o$ and a reference effective NMO velocity $V_{nmo}$, an analytical RMO function was defined to measure time residuals of the long-spread offset image gather generated by anisotropic Kirchhoff PSTM following expression (3) where t is the migrated time of an image point as a function of offset in an offset image gather, T is the two-way reflection travel-time from P-wave data. Thus, substituting equation (2) into equation (3) yields the final result of expression (4).

Figure 2:
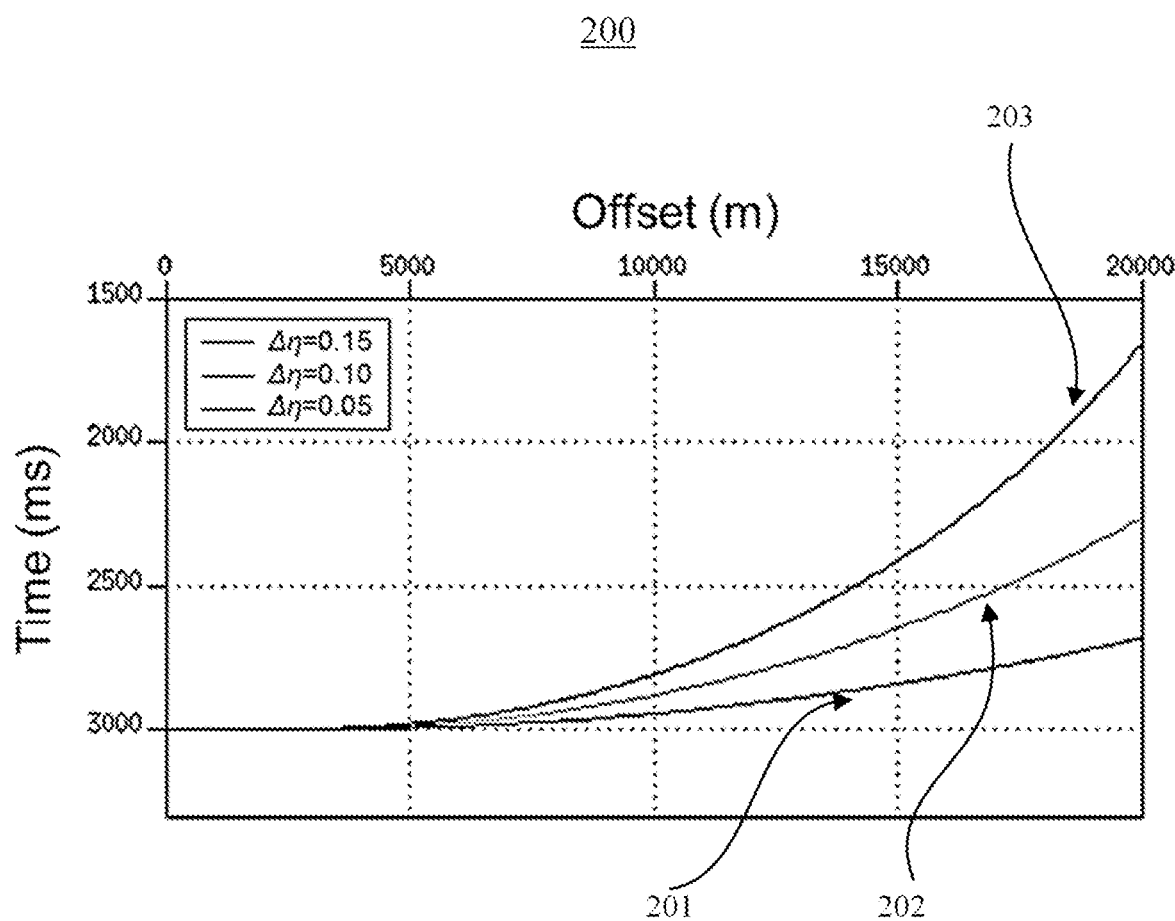
FIG. 2, illustrates in graphic representation, the RMO functions with various values of anellipticity parameter perturbation $\Delta\eta$ for a single horizontal VTI layer, as executed by the computing system, according to an embodiment of the present disclosure.

Referring to FIG. 2 it illustrates a result of the proposed embodiment, the dependence of analytical RMO function, on variations in anellipticity parameter perturbation Δη, 200, for a single horizontal VTI layer model with a true positive value of η=0.20. The background P-wave vertical velocity is 3.0 km/s, and the Thomsen's anisotropy parameters ε and δ are 0.34 and 0.10, respectively. The horizontal reflector locates at the depth of 4.5 km. The anellipticity parameter perturbation Δη is defined as the difference between the true value η and the initial value η0. The RMO functions are calculated using equation (4) for the perturbation values Δη for 0.05 (201), 0.10 (202), and 0.15 (203), respectively. The RMO function varies quickly with increases to the offset and anellipticity parameter perturbation Δη. Trivial RMO can be also observed on the near offset, in which an offset is less than or equal to a reflector depth, which reveals that the anellipticity parameter should be estimated over the long-spread P wave data.

Figure 3:
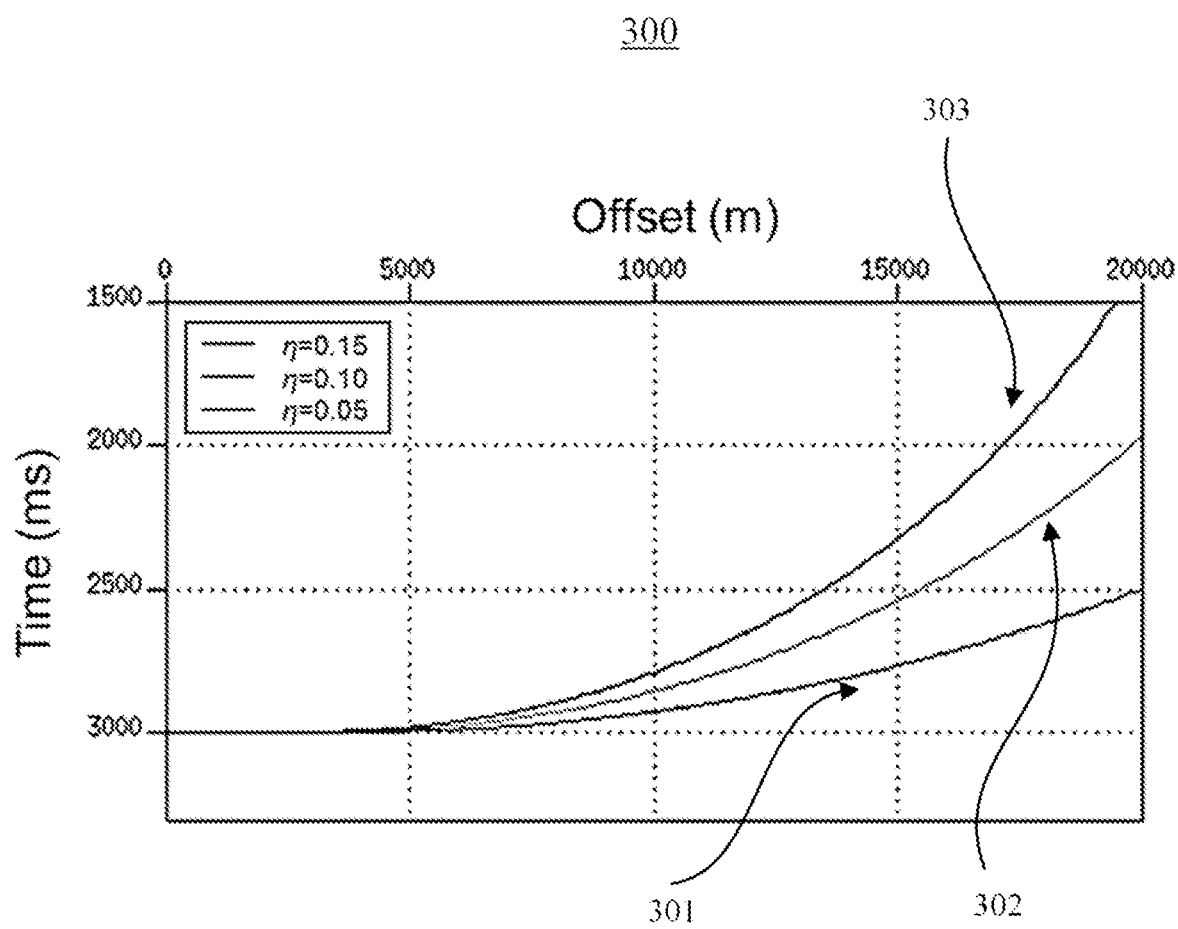
FIG. 3, illustrates in graphic representation, the RMO functions with various values of anellipticity parameter $\eta$ for a single horizontal VTI layer as executed by the computing system, according to an embodiment of the present disclosure.

Similarly, FIG. 3 illustrates the analytical RMO functions for various values of the anellipticity parameter η for a single horizontal VTI layer, 300, as result of the disclosed method and system. The RMO functions are calculated from equation (5) for the values of η for 0.05 (301), 0.10 (302), and 0.15 (303), respectively. All the other parameters are the same as those shown in FIG. 2. In addition to the two features of the RMO function demonstrated in FIG. 2; FIG. 3 indicates that effective values of anisotropy parameter can be also estimated using the isotropic time-migrated common image gathers other than traditional CMP gathers.

A robust and effective method for estimating effective values of the anellipticity parameter η in offset image gathers is based on computing semblance scans as a function of RMO parameter η. The maxima of the semblance for each migrated time can be chosen that are associated with estimates of effective values of the anellipticity parameter η. This method is stable because semblance analysis is less sensitive to travel-time errors than least-square travel-time fitting. Furthermore, this semblance-based estimation method is effective when the RMO function used for computing semblance closely approximates the true moveouts in the offset image gather.

Grechka and Tsvankin (1988), supra, introduced a correction into the nonhyperbolic moveout equation of Alkhalifah and Tsvankin (1995), supra, that makes it even more accurate at intermediate offsets most important for nonhyperbolic moveout analysis. This modification changes the moveout at large offsets yet keeps the correct values of the quadratic and quartic moveout coefficients. Thus, equation (4) can be rewritten as:

$$t^2(x) = t_0^2 + \frac{2\eta_0 x^4}{V_{nmo}^2[t_0^2 V_{nmo}^2 + C(1+2\eta_0)x^2]} - \frac{2\eta x^4}{V_{nmo}^2[t_0^2 V_{nmo}^2 + C(1+2\eta)x^2]}; \quad (7)$$

with C=1.2. As such, equation (7) can be used to compute the semblance S of an offset image gather, as defined by equation (6) (See Neidell and Taner, 1971, Semblance and other coherency measures for multichannel data, Society of Exploration Geophysicists, Volume 36 Issue 3, pp. 467-618) where t is a proposed RMO function defined by equation (7), $t_0$ is a migrated-time of the image point at zero offset, x is the offset between a source and a receiver, q is a trace amplitude in an offset image gather, and l is a window length used to smooth the semblance spectrum estimates. Effective values of the anellipticity parameter η for different time $t_0$ are then obtained from the picked maxima values of the semblance. The semblance S defined by equation (7) can be generated by scanning values of η from −0.2 to 0.2.

Figure 4:
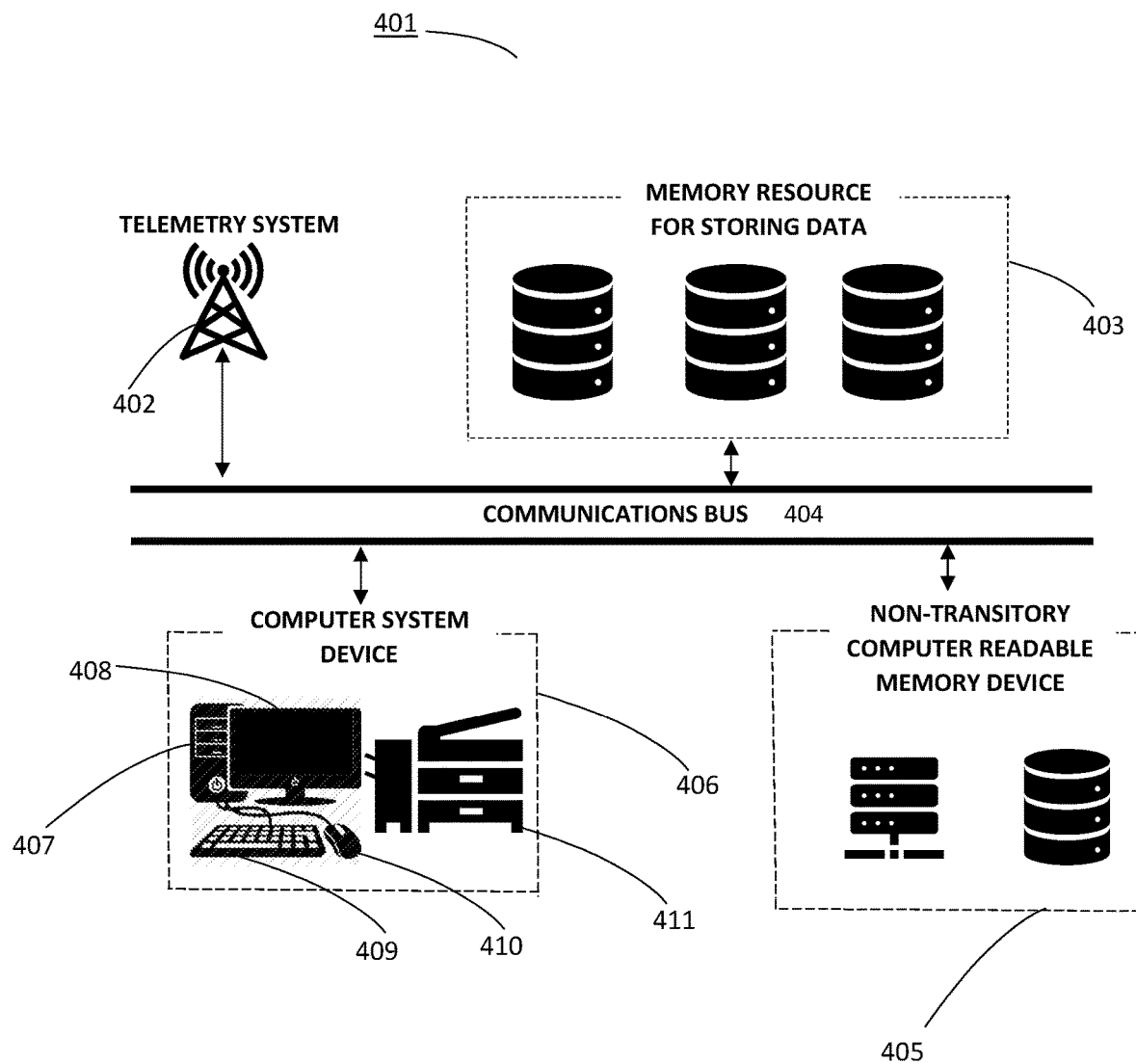
FIG. 4, is an electric diagram, in block form of the computing system for performing a method that uses time-migrated common image gathers, to generate an anisotropy parameter to obtain high-resolution time-migrated image gathers for reservoir characterization, and interpretation, according to an embodiment of the present disclosure.

As it pertains to FIG. 4, the computing system 401 is shown comprising a telemetry system 402, a memory resource for storing data 403, a communication bus 404, a non-transitory computer readable memory device 405, and a computer system device 406. The computing system 401, it illustrates a functional block diagram used to perform an array of operations of the method that uses time-migrated common image gathers, to generate an anisotropy parameter to obtain high-resolution time-migrated image gathers for reservoir characterization, and interpretation, 501.

The memory resource 403 may include any of various forms of memory media and memory access devices. For example, memory devices 403 may include semiconductor RAM and ROM devices as well as mass storage devices such as CD-ROM drives, magnetic disk drives, and magnetic tape drives.

The computer system device, 406, acts as a user interface the non-transitory program computer readable memory storage device, 405; to input, set, select, and perform the operations of acquiring, storing, computing, generating, calculating, and repeating, (collectively the message hook procedures). Said computer system device, 406, is connected to (wired and/or wirelessly) through a communication device 404 to the telemetry system 403, to the memory resource 403, and to the non-transitory computer readable memory device 405. The computer system device, 406, further includes other devices like a central processing unit (CPU), 407, a display or monitor, 408, a keyboard, 409, a mouse, 410, and a printer, 411. One or more users may supply input to the computing system 401 through the set of input devices of the computing system 406 like 409 or 410. Nevertheless, a person having ordinary skills in the art will soon realize that input devices may also include devices such as digitizing pads, track balls, light pens, data gloves, eye orientation sensors, head orientation sensors, etc. The set of display devices 408 and 411 may also include devices such as projectors, head-mounted displays, plotters, etc.

In one embodiment of computing system 401 may include one or more communication devices (communications bus) 404, like network interface cards for interfacing with a computer network. For example, seismic data gathered at a remote site may be transmitted to the computing system 401 using a telemetry system 402, through a computer network. The computing system 401 may receive seismic data, initial anellipticity anisotropy parameters, and/or baseline normal-moveout velocity values in parallel or series, from an external computer network using the communication's bus 404 network interface card. In other embodiments, the computing system 401 may include a plurality of computers and/or other components coupled over a computer network, where storage and/or computation implementing embodiments of the present may be distributed over the computers (and/or components) as desired.

The computing system, 401, has firmware, a kernel and a software providing for the connection and interoperability of the multiple connected devices, like the telemetry system 402, the memory resources for storing data, 403, the communication bus 404, the non-transitory computer readable memory device, 405, and the computer system device, 406. The computing system, 401, includes an operating system, a set of message hook procedures, and a system application.

Furthermore, because performance and computation costs are always an important issue, the computing system, 401, uses the non-transitory computer readable memory device, 405 to ensure that the steps of the method 501 will not be bottlenecked by the computing system's (401) I/O, or any other network communications. In fact, file-distribution systems like Apache Hadoop in combination with proper data-compressions, as well as smart file caching according to the data will ensure that the method that uses time-migrated common image gathers, to generate an anisotropy parameter to obtain high-resolution time-migrated image gathers for reservoir characterization, and interpretation is only limited by the memory/cache speed and CPU/GPU computing power, and nothing else.

The operating system embedded within the computing system 401, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of computing system 401 may, for example, represent an operation or command of the memory resources, 403, the computer system device, 406, the non-transitory computer readable memory device, 405, which may be currently executing a certain step process or subroutine from the method that uses time-migrated common image gathers, to generate an anisotropy parameter to obtain high-resolution time-migrated image gathers for reservoir characterization, and interpretation, 501.

The set of message hook procedures may be first initiated by: (i) an input from a user, which will typically be a person having ordinary skills in the art, like the entering of user-defined values or parameters; (ii) the manipulation of the computer system device, 406; (iii) the processing of operations in the non-transitory computer readable memory device, 405; or (iv) automatically once certain data has been stored or retrieved by either the memory resources, 403, or the non-transitory computer readable memory device, 405. Based on any of these inputs, processes or manipulation events, the memory resource, 403, the non-transitory computer readable memory device, 405, or the computer system device, 406; generate a data packet that is passed using the communication bus, 404, which are indicative of the event that has occurred as well as the event that needs to occur. When either the memory resource, 403, the non-transitory computer readable memory device, 405, or the computer system device, 406, receive the data packet, they convert it into a message based on the event, and executes the required step of the method 501. This is achieved when the operating system examines the message hook list and determines if any message hook procedures have registered themselves with the operating system before. If at least one message hook procedure has registered itself with the operating system, the operating system passes the message via the communication bus 404 to the registered message hook procedure that appears first on the list. The called message hook executes and returns a value to either the memory resource, 403, the non-transitory computer readable memory device, 405, or the computer system device, 406, instructing them, to pass the message to the next registered message hook, and either the memory resource, 403, the non-transitory computer readable memory device, 405, or the computer system device, 406. The computing system, continues executing the operations until all registered message hooks have passed, which indicates the completion of the method 501 by the generation of a final anellipticity anisotropy parameter.

The non-transitory computer readable memory device, 405, is configured to read and execute program instructions, e.g., program instructions provided on a memory medium such as a set of one or more CD-ROMs and loaded into semiconductor memory at execution time. The non-transitory computer readable memory device, 405 may be coupled wired or wireless to memory resource 403 through the communication bus 404 (or through a collection of busses). In response to the program instructions, the non-transitory computer readable memory device, 405 may operate on data stored in one or more memory resource 403. The non-transitory computer readable memory device, 405 may include one or more programmable processors (e.g., microprocessors).

According the preferred embodiment of the present invention, certain hardware, and software descriptions were detailed, merely as example embodiments and are not to limit the structure of implementation of the disclosed embodiments. For example, although many internal, and external components of the receiving system apparatus of FIG. 4 have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

Figure 5:
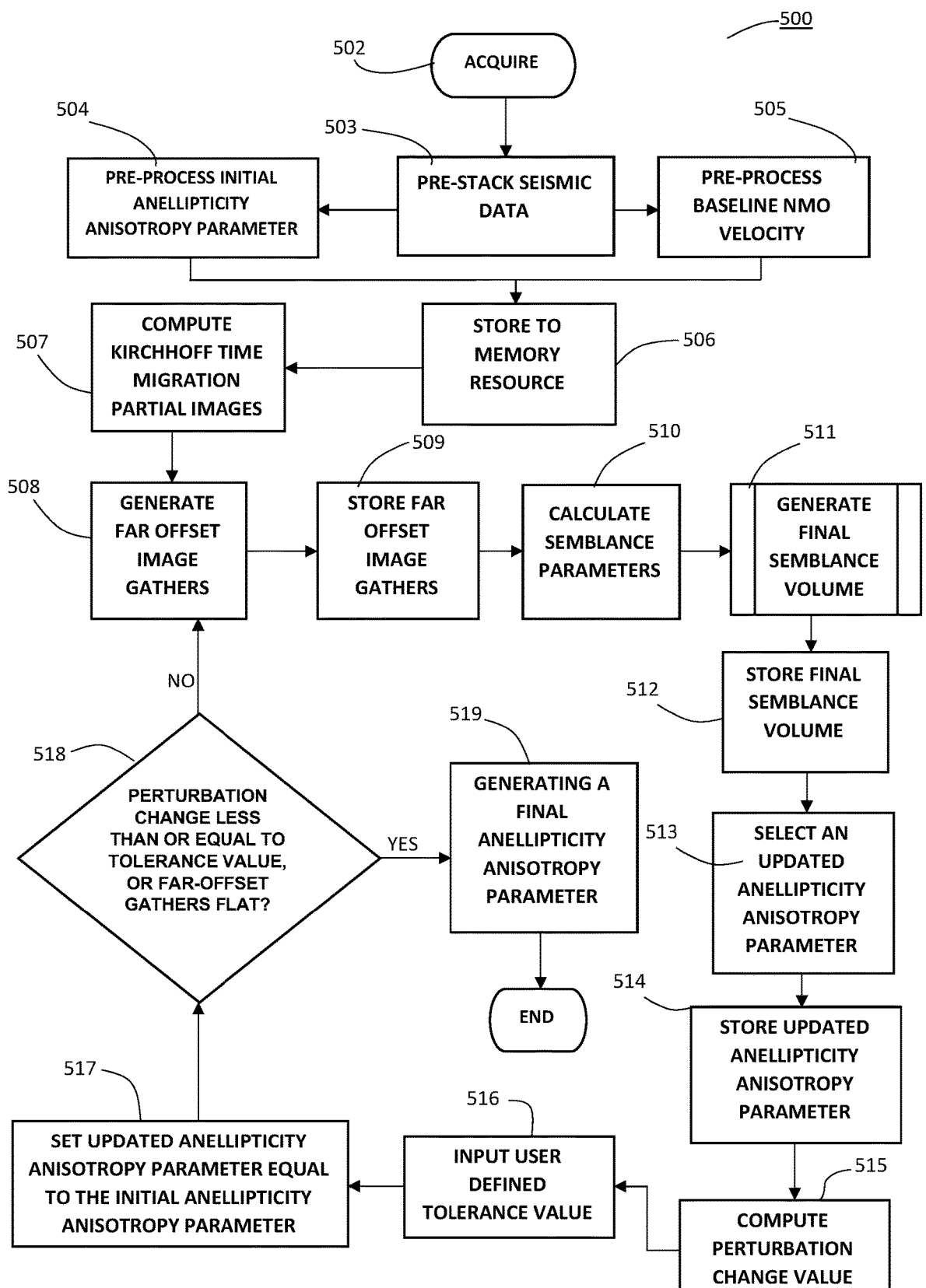
FIG. 5, is a flow chart showing the method that employs an anisotropy parameter, to generate a high-resolution time-migrated image gathers for reservoir characterization, and interpretation according to an embodiment of the present disclosure.
Figure 7:
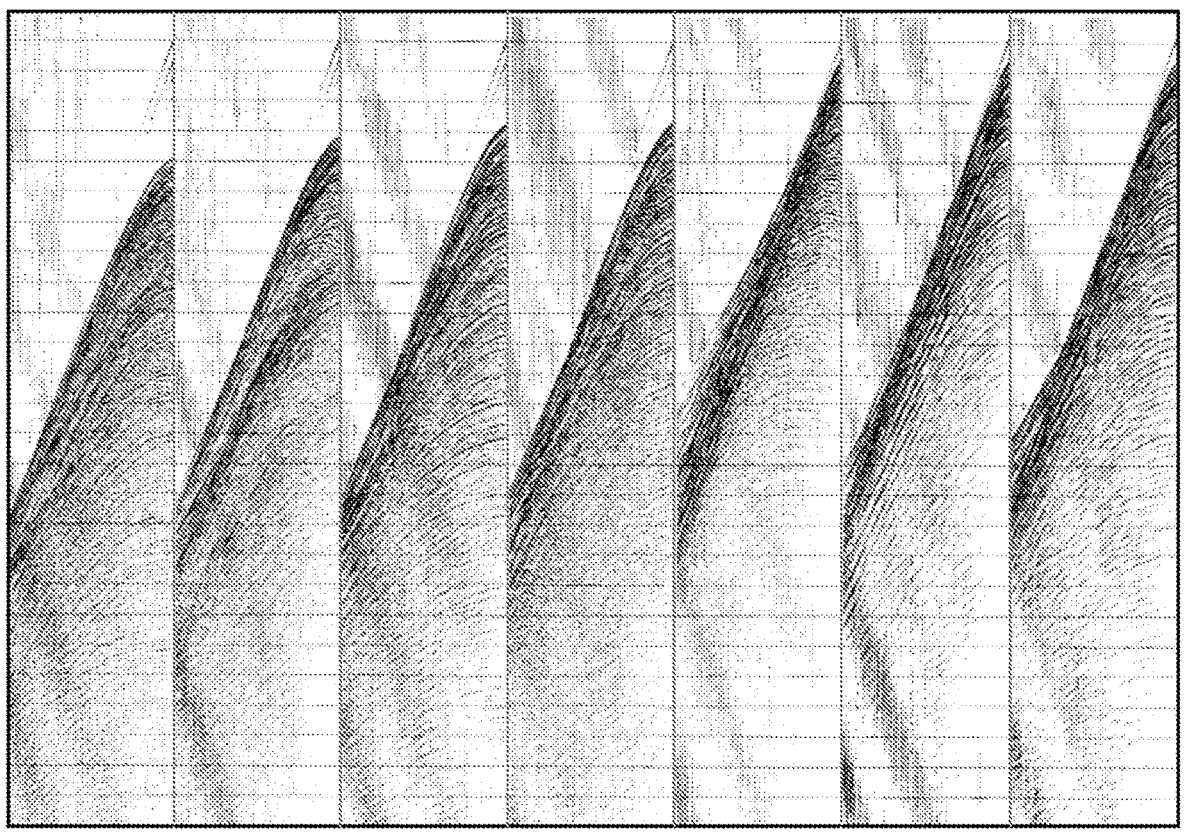
FIG. 7, illustrates in graphic representation, raw pre-stack seismic data acquired from receivers like geophones, according to an embodiment of the present disclosure.
Figure 8:
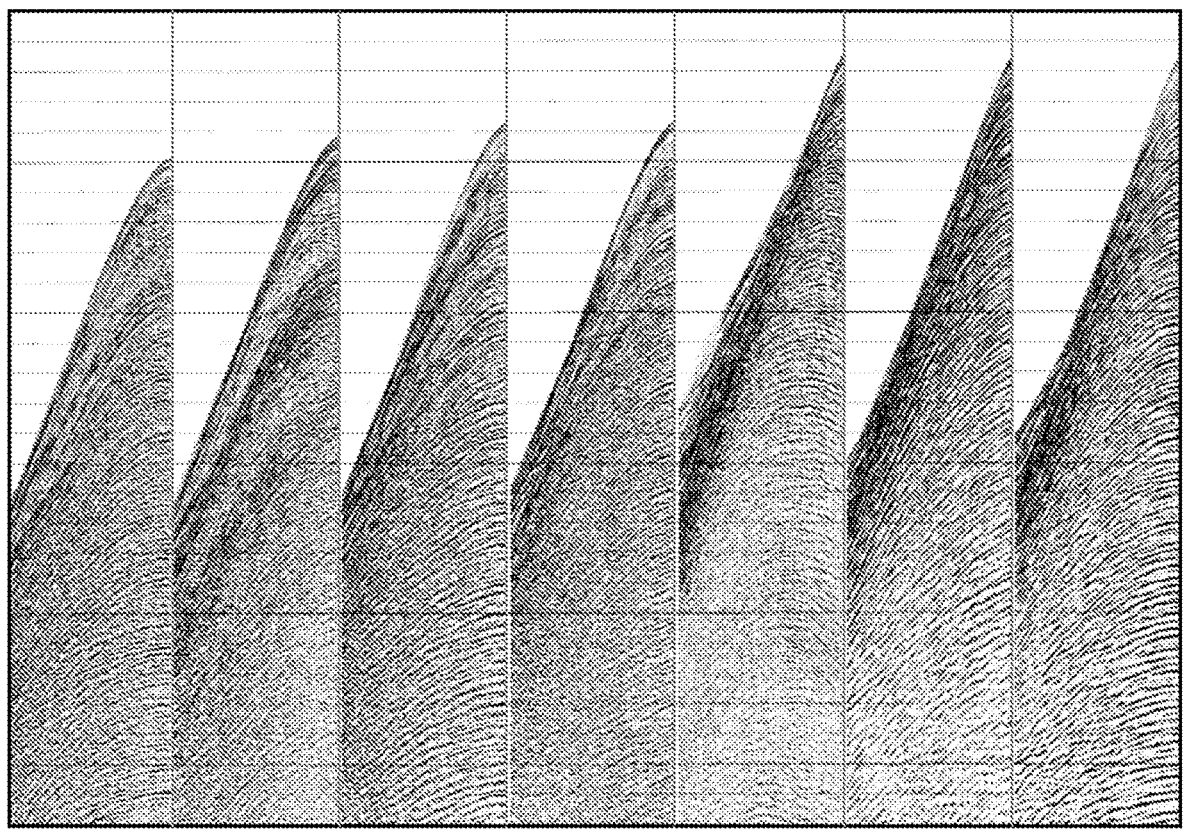
FIG. 8, illustrates in graphic representation the pre-stack seismic data the after the pre-processing step, according to an embodiment of the present disclosure.

Turning over to FIG. 5, it illustrates a flow chart showing the method that employs an anisotropy parameter, to generate a high-resolution time-migrated image gathers for reservoir characterization, and interpretation. The method starts when the non-transitory computer readable memory device, 405, receives a message hook from the telemetry system 402 that it has started acquiring at 502, a pre-stack seismic data which is illustrated in graphic form on FIG. 7. Said pre-stack seismic data 502, is acquired by the telemetry system 402, from a plurality of receivers 105 located over a defined survey region 101. Once the pre-stack seismic data 502 has been acquired, the non-transitory computer readable memory device, 405 will begin pre-processing at 503, an initial anellipticity anisotropy parameter, and at 504, a baseline normal-moveout velocity 505. These pre-processing steps (504, and 505) involve trace editing, prefiltering, denoising, amplitude correction, that are pre-programmed in the non-transitory computer readable memory device, 405. A person having ordinary skills in the art will realize, that for land data as that represented in survey region 101, elevation statics are also applied at these steps to reduce travel-times to a common datum level. This common datum level may be flat or vary (floating datum) along the line. Reduction of travel-times to a datum usually requires correction for the near-surface weathering layer in addition to differences in elevation of source and receiver stations. An example of the method and system pre-processing steps is illustrated in FIG. 8.

Nevertheless, a person having ordinary skills in the art will soon realize that 503, 504, and 505 may also be acquired in a variety of other ways. For example, the seismic data may be obtained from a variety of seismic surface or subsurface seismic tomography surveys, like P-wave, S-wave, Mode-Converted, Vertical Seismic Profiles, among others. Generally, the pre-stack seismic data are the common shot gathers with horizontal axis of offset and vertical axis of time. On the other hand, a person having ordinary skills may soon realize that the initial anellipticity parameter 504, can be estimated from many ways: (a) it can either be inputted by user with a constant value, say 0.02, or it can be estimated using the conventional anellipticity parameter analysis using long-spread P-wave data, like that proposed by Alkhalifah and Tsvankin, 1995, supra. The reference NMO velocity 505 can be obtained from conventional hyperbolic moveout analysis using the near-offset P-wave data or from pre-migrated nonhyperbolic moveout analysis using long-spread P-wave data. The term "baseline" here means that we set NMO velocity as a reference parameter and it does not update, and method 501 will only allow the anellipticity parameter to update (or method 501 can change it to "NMO velocity").

Upon successfully acquiring the necessary data, the non-transitory computer readable memory device, 405, will send a message hook at 506 to the memory resource 403 to begin storing 503, 504, and 505. The memory resource 403 will then message the non-transitory computer readable memory device, 405 to begin, at 507, computing an anisotropic Kirchhoff time migration partial image, using the stored pre-stack seismic data, 503, the stored initial anellipticity anisotropy parameter, 504, and the stored baseline normal-moveout, 505. Once the non-transitory computer readable memory device, 405, computed the Kirchhoff time migration partial images, it begins generating far-offset image gathers with horizontal axis of offset and vertical axis of time at 508. The anisotropic Kirchhoff Time Migration (KTMIG) is performed using the NMO velocity and the effective anellipticity parameter $\eta$ as input. In the first iteration of KTMIG, the effective anellipticity parameter model comprises an initial $\eta$ model. In the subsequent iterations of KTMIG, the effective anellipticity parameter model may comprise an updated $\eta$ model from the semblance picking step. Step 507 uses KTMIG to determine the offset image gathers that are the required input for creating semblance. The offset image gathers, 508, are the output from KTMIG step with horizontal axis of offset and vertical axis of time. If the input models are correct, all the events in the offset image gathers are flat, otherwise, they will curl up or curl down. Method 501 can then use this residual information to further update/refine the anellipticity parameter model.

Upon completion of step 508, the non-transitory computer readable memory device, 405, will message through the communication bus 404, for the memory resource 403 to begin storing the generated far-offset image gathers, with horizontal axis of offset and vertical axis of time at 509. The memory resource 403 will message the non-transitory computer readable memory device, 405 that step 509 has been successfully completed so that the non-transitory computer readable memory device, 405 can begin calculating a plurality of semblance parameters, using the stored far-offset image gathers at 510.

Figure 6:
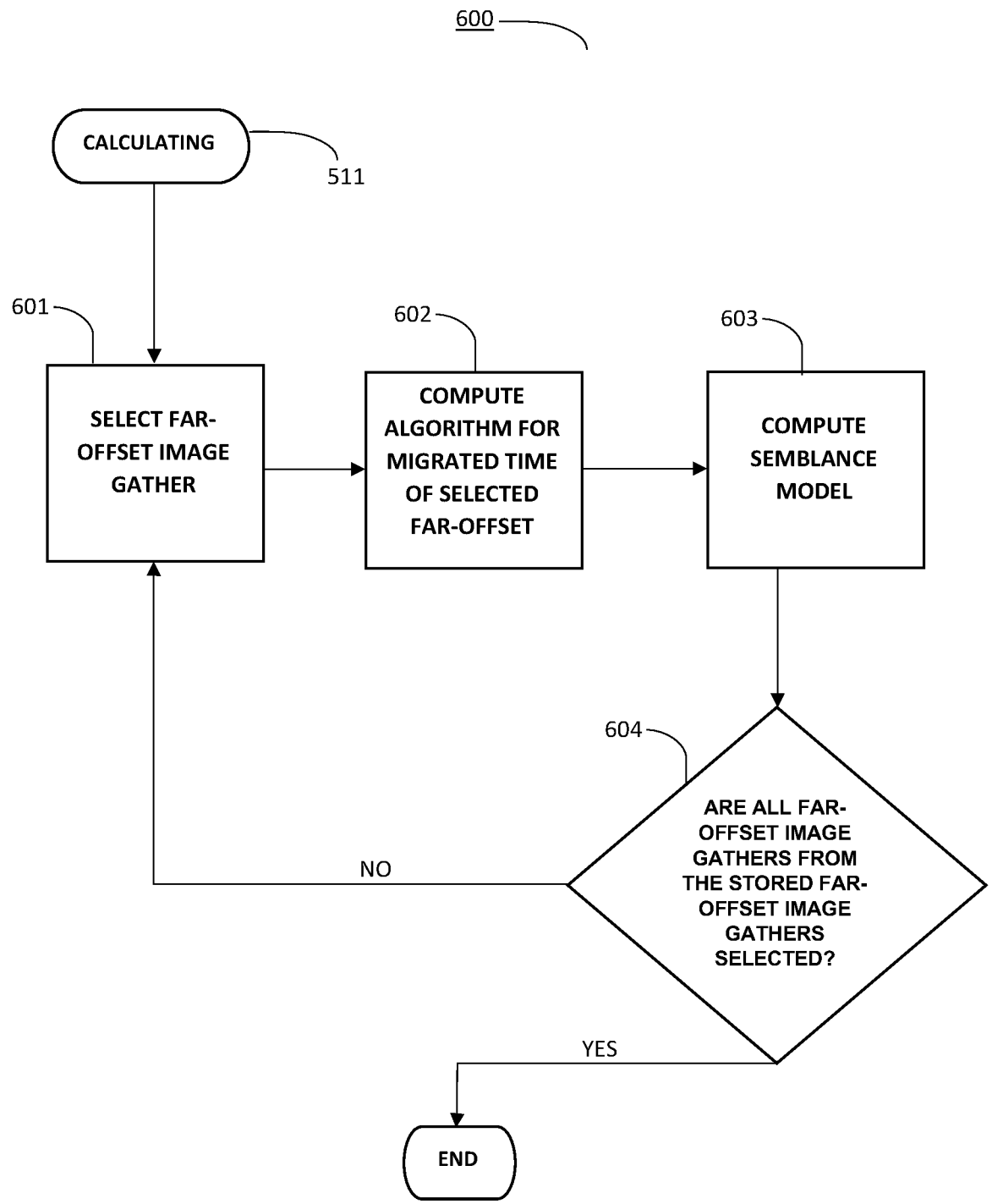
FIG. 6, illustrates a flow chart of the sub-routine of calculating a plurality of semblance parameters, using the generated far-offset image gathers as executed by the non-transitory program computer readable memory storage device, according to an embodiment of the present disclosure.

Step 510 will be performed as a subroutine method on the non-transitory computer readable memory device, 405, in order to minimize computational costs and reduce bottlenecks with the I/O. FIG. 6, illustrates such sub-routine in a flow chart that gets initiated when the non-transitory computer readable memory device, 405, receives the signal to begin step 510. The first step 601 of said subroutine involves initiating a message by the non-transitory computer readable memory device, 405, to the computer system 406 to display on 408, using a user-interface, a dialog box for the user of the method to select whether the non-transitory computer readable memory device, 405, or the user will select a far-offset image gather from the generated far-offset image gathers, that corresponds to the acquired initial anellipticity anisotropy parameter and the acquired baseline normal-moveout velocity. Once the user confirms that the a far-offset image gather from the generated far-offset image gathers, that corresponds to the acquired initial anellipticity anisotropy parameter and the acquired baseline normal-moveout velocity was selected, the computer system device 406 through its CPU 407, will message, using the communication bus 404 to the non-transitory computer readable memory device 405, that the selection is ready to be stored at on the memory resource 403. In parallel, the non-transitory computer readable memory device 405, will begin computing at 603 an algorithm for migrated time of the selected far-offset image gather from all the generated far-offset image gathers, as a function of the acquired initial anellipticity anisotropy parameter according to expression (4). The non-transitory computer readable memory device 405, will then begin computing a semblance model using the computed migrated time of the far-offset image gather according to expression (6). The non-transitory computer readable memory device 405, will repeat at 604 the steps of selecting a far-offset image gather, computing an algorithm for migrated time of the selected far-offset image gather, and computing a semblance model until all far-offset image gathers from the stored far-offset image gathers have been selected.

Once the non-transitory computer readable memory device, 405 completes the subroutine step 604, it will message the non-transitory computer readable memory device, 405 to begin generating a final semblance volume from the calculated plurality of semblance parameters at step 511. One, the non-transitory computer readable memory device, 405, completes step 511, it will signal the memory resource 403, via the communication bus 404, to begin storing a final semblance volume to the memory resource at 512. Completion of step 512 will initiate a message to the non-transitory computer readable memory device, 405, so that the computer system 406 displays on 408, using a user-interface, a dialog box for the user of the method to select whether the non-transitory computer readable memory device, 405, or the user will select at 513, an updated anellipticity anisotropy parameter from the maxima of the stored final semblance volume. Once the user confirms that the updated anellipticity anisotropy parameter from the maxima of the stored final semblance volume was selected, the computer system device 406 through its CPU 407, will message using the communication bus 404 to the non-transitory computer readable memory device 405, that the selection of the updated anellipticity anisotropy parameter, is ready to be stored at 514 on the memory resource 403. Upon successful storage at 514, the memory resource 403 will message the non-transitory computer readable memory device 405, to being computing at 515, a perturbation change value which will computed between the updated anellipticity anisotropy parameter and the initial anellipticity anisotropy parameter. At which point, the non-transitory computer readable memory device 405, will initiate a message hook procedure to the computer system 406 so that is displays on 408 via a user-interface, a dialog box for the user of the method 501, to begin at 516 inputting a user-defined tolerance value which can either be a constant value e.g. 0.02, or it can be a value from the conventional anellipticity parameter analysis using long-spread P-wave data. Once the user confirms the user-defined tolerance value through the use of one of the input devices like 409 or 410, the CPU 407 will message the non-transitory computer readable memory device 405, to set at 517 the stored updated anellipticity anisotropy parameter equal to the initial anellipticity anisotropy parameter. Thereafter, the non-transitory computer readable memory device 405 will repeat at 518 the steps of computing the anisotropic Kirchhoff time migration partial images, 507, generating far-offset image gathers with horizontal axis of offset and vertical axis of time, 508, storing the generated far-offset image gathers, 509, calculating a plurality of semblance parameters, 510, generating a final semblance volume, 511, storing the final semblance volume, 512, selecting an updated anellipticity anisotropy parameter, 513, storing the updated anellipticity anisotropy parameter, 514, and computing a perturbation change value, 515, until the computed perturbation change value 515 is less than or equal to the inputted user-defined tolerance value 516, or until the generated far-offset image gathers are flat. Finally, if the aforementioned of step 518 conditions are met, the non-transitory computer readable memory device 405 will generate at 519, final anellipticity anisotropy parameter, as well as signal the computer system device 406, to display on 408 a message to the user to decide whether to store said final anellipticity anisotropy parameter to the memory resource 403, to print the results to the printing device 411, or both.

It is to be noted that, As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

Also, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. "Computing" may include resolving, selecting, choosing, establishing, and the like.

Embodiments disclosed herein also relate to a computing system used to perform the operations of the method that uses time-migrated common image gathers, to generate an anisotropy parameter to obtain high-resolution time-migrated image gathers for reservoir characterization, and interpretation. This system may be specially constructed for the required purposes, or it may comprise a general-purpose computer selectively activated or reconfigured by a computer program or code stored in the memory resources, or non-transitory computer readable memory. As such, the computer program or code for the method disclosed herein may be stored or encoded in a computer readable medium or implemented over some type of transmission medium. A computer-readable medium includes any medium or mechanism for storing or transmitting information in a form readable by a machine, such as a computer ('machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical or other form of propagated signals (e.g., carrier waves, infrared signals, digital signals, etc.).

A receiving system or sensor as used herein, typically includes at least hardware capable of executing machine readable instructions, as well as the software for executing acts (typically machine-readable instructions) that produce a desired result. In addition, a retrieving system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices and networks.

An "output device" includes the direct act that causes generating, as well as any indirect act that facilitates generation. Indirect acts include providing software to an user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the a local network, a wireless network of the Internet.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified

SYMBOLS TABLE

| Symbol | Brief Definition |
| --- | --- |
| T | the two-way reflection traveltime |
| $t_0$ | the two-way zero-offset reflection traveltime |
| x | the offset between a source and a receiver |
| $V_{nmo}$ | the reference effective NMO velocity |
| $\eta$ | the effective anellipticity parameter |
| $\eta_0$ | the initial effective anellipticity parameter |
| $\Delta\eta$ | the anellipticity parameter perturbation |
| S | the semblance of an offset image gather |
| q | the trace amplitude in an offset image gather |
| l | the window length used to smooth the semblance spectrum estimates |

What it is claimed is:

1. A method for reservoir characterization and interpretation comprising:

arranging a grid comprising a plurality of shot lines and a plurality of receiver lines over a survey region;

deploying a plurality of shots along the plurality of shot lines, wherein each shot line has one or more shots deployed thereon;

acquiring pre-stack seismic data generated by the plurality of shots, wherein the pre-stack seismic data includes common shot gathers with horizontal axis of offset and vertical axis of time;

pre-processing an initial anellipticity anisotropy parameter using conventional anellipticity anisotropy parameter analysis with long-spread P-wave data;

pre-processing a baseline normal-moveout velocity using conventional hyperbolic moveout analysis from a near-offset P-wave data or from a pre-migrated nonhyperbolic moveout analysis using long-spread P-wave data;

storing the acquired pre-stack seismic data, the acquired initial anellipticity anisotropy parameter, and the acquired baseline normal-moveout velocity to a memory resource;

computing an anisotropic Kirchhoff time migration partial image, using the stored pre-stack seismic data, the stored initial anellipticity anisotropy parameter, and the stored baseline normal-moveout;

generating far-offset image gathers with horizontal axis of offset and vertical axis of time, from the computed anisotropic Kirchhoff time migration partial images;

storing the generated far-offset image gathers, with horizontal axis of offset and vertical axis of time, to the memory resource;

calculating a plurality of semblance parameters, using the stored far-offset image gathers;

generating a final semblance volume from the calculated plurality of semblance parameters;

storing the final semblance volume to a memory resource;

selecting an updated anellipticity anisotropy parameter from the maxima of the stored final semblance volume;

storing the updated anellipticity anisotropy parameter to a memory resource; computing a perturbation change value between the updated anellipticity anisotropy parameter and the initial anellipticity anisotropy parameter;

inputting a user-defined tolerance value; setting the stored updated anellipticity anisotropy parameter equal to the initial anellipticity anisotropy parameter;

repeating the steps of computing an anisotropic Kirchhoff time migration partial images, generating far-offset image gathers with horizontal axis of offset and vertical axis of time, storing the generated far-offset image gathers, with horizontal axis of offset and vertical axis of time, to the memory resource;

calculating a plurality of semblance parameters, generating a final semblance volume, storing the final semblance volume, selecting an updated anellipticity anisotropy parameter, storing the updated anellipticity anisotropy parameter, computing a perturbation change value, until the computed perturbation change value is less than or equal to the inputted user-defined tolerance value, or until the generated far-offset image gathers are flat; and generating a final anellipticity anisotropy parameter.

2. The method of claim 1, wherein calculating a plurality of semblance parameters, using the generated far-offset image gathers further comprises the steps of:

selecting a far-offset image gather from the generated far-offset image gathers, that corresponds to the acquired initial anellipticity anisotropy parameter and the acquired baseline normal-moveout velocity;

computing an algorithm for migrated time of the selected far-offset image gather from all the generated far-offset image gathers, as a function of the acquired initial anellipticity anisotropy parameter according to expression:

$$t^2(x) = t_0^2 + \frac{2\eta_0 x^4}{V_{nmo}^2[t_0^2 V_{nmo}^2 + (1+2\eta_0)x^2]} - \frac{2\eta x^4}{V_{nmo}^2[t_0^2 V_{nmo}^2 + (1+2\eta)x^2]}$$

wherein $t_{(x)}$ is a migration time, $t_0$ is a migrated-time of an image point at zero offset, and x is an offset between a source and a receiver, $V_{nmo}$ is an effective normal moveout velocity, $n_o$ is an initial effective anellipticity parameter, $\eta$ is an updated effective anellipticity parameter; computing a semblance model using the computed migrated time of the far-offset image gather according to expression:

$$S(\eta, t_0) = \frac{\int_{t_0-l/2}^{t_0+l/2} \left[\int q(t(\eta,x),x)dx\right]^2 dt}{\int_{t_0-l/2}^{t_0+l/2} \int q^2(t(\eta,x),x)dxdt}$$

wherein q is a trace amplitude in an offset image gather and l is a window length used to smooth a semblance spectrum estimate; and repeating the steps of selecting a far-offset image gather, computing an algorithm for migrated time of the selected far-offset image gather, and computing a semblance model until all far-offset image gathers from the stored far-offset image gathers have been selected.

3. The method of claim 2, wherein the semblance S is generated by scanning values of η between −0.2 to 0.2.

4. A system for reservoir characterization and interpretation comprising:

a grid comprising a plurality of shot lines and a plurality of receiver lines over a survey region, wherein each shot line has one or more shots deployed thereon and each receiver line has a plurality of receivers disposed thereon;

a telemetry system for sending and receiving pre-stack seismic data from the survey region;

a memory resource for storing data;

a computer system output device; and a non-transitory computer readable memory device coupled to the telemetry system, coupled to the memory resource, and coupled to the computer system output device, programmed for performing the operations of:

acquiring pre-stack seismic data, wherein the pre-stack seismic data includes common shot gathers with horizontal axis of offset and vertical axis of time;

pre-processing an initial anellipticity anisotropy parameter using conventional anellipticity anisotropy parameter analysis with long-spread P-wave data;

pre-processing a baseline normal-moveout velocity using conventional hyperbolic moveout analysis from a near-offset P-wave data or from a pre-migrated nonhyperbolic moveout analysis using long-spread P-wave data;

storing the acquired pre-stack seismic data, the acquired initial anellipticity anisotropy parameter, and the acquired baseline normal-moveout velocity to a memory resource;

computing an anisotropic Kirchhoff time migration partial image, using the stored pre-stack seismic data, the stored initial anellipticity anisotropy parameter, and the stored baseline normal-moveout;

generating far-offset image gathers with horizontal axis of offset and vertical axis of time, from the computed anisotropic Kirchhoff time migration partial images;

storing the generated far-offset image gathers, with horizontal axis of offset and vertical axis of time, to the memory resource;

calculating a plurality of semblance parameters, using the stored far-offset image gathers; generating a final semblance volume from the calculated plurality of semblance parameters;

storing the final semblance volume to a memory resource;

selecting an updated anellipticity anisotropy parameter from the maxima of the stored final semblance volume;

storing the updated anellipticity anisotropy parameter to a memory resource;

computing a perturbation change value, between the updated anellipticity anisotropy parameter and the initial anellipticity anisotropy parameter;

inputting a user-defined tolerance value;

setting the stored updated anellipticity anisotropy parameter equal to the initial anellipticity anisotropy parameter;

repeating the steps of computing an anisotropic Kirchhoff time migration partial images, generating far-offset image gathers with horizontal axis of offset and vertical axis of time, storing the generated far-offset image gathers, with horizontal axis of offset and vertical axis of time, to the memory resource;

calculating a plurality of semblance parameters, generating a final semblance volume, storing the final semblance volume, selecting an updated anellipticity anisotropy parameter, storing the updated anellipticity anisotropy parameter, computing a perturbation change value, until the computed perturbation change value is less than or equal to the inputted user-defined tolerance value, or until the generated far-offset image gathers are flat; and generating a final anellipticity anisotropy parameter.

5. The system of claim 4, wherein calculating a plurality of semblance parameters using the generated far-offset image gathers further comprises the steps of:

selecting a far-offset image gather from the generated far-offset image gathers, that corresponds to the acquired initial anellipticity anisotropy parameter and the acquired baseline normal-moveout velocity;

computing an algorithm for migrated time of the selected far-offset image gather from all the generated far-offset image gathers, as a function of the acquired initial anellipticity anisotropy parameter according to expression:

$$t^2(x) = t_0^2 - \frac{2\eta x^4}{V_{nmo}^2 [t_0^2 V_{nmo}^2 + (1 + 2\eta)x^2]}$$

wherein $t_{(x)}$ is a migration time, $t_0$ is a migrated-time of an image point at zero offset, and x is an offset between a source and a receiver, $V_{nmo}$ is an effective normal moveout velocity, $n_o$ is an initial effective anellipticity parameter, η is an updated effective anellipticity parameter; computing a semblance model using the computed migrated time of the far-offset image gather according to expression:

$$S(\eta, t_0) = \frac{\int_{t_0-l/2}^{t_0+l/2} \left[ \int q(t(\eta, x), x) dx \right]^2 dt}{\int_{t_0-l/2}^{t_0+l/2} \int q^2(t(\eta, x), x) dx dt}$$

wherein q is a trace amplitude in an offset image gather and l is a window length used to smooth a semblance spectrum estimate; and repeating the steps of selecting a far-offset image gather, computing an algorithm for migrated time of the selected far-offset image gather, and computing a semblance model until all far-offset image gathers from the stored far-offset image gathers have been selected.

6. The system of claim 5, wherein the semblance S is generated by scanning values of η between −0.2 to 0.2.

* * * * *